US 11,442,477 B2

(12) United States Patent
Messner

(10) Patent No.: US 11,442,477 B2
(45) Date of Patent: Sep. 13, 2022

(54) BI-DIRECTIONAL REGULATOR SYSTEM FOR SIMULTANEOUS HIGH-PRESSURE FILLING AND LOW-PRESSURE DEPLETING OF GAS TANK

(71) Applicant: William Messner, Downers Grove, IL (US)

(72) Inventor: William Messner, Downers Grove, IL (US)

( * ) Notice: Subject to any disclaimer, the term of this patent is extended or adjusted under 35 U.S.C. 154(b) by 0 days.

(21) Appl. No.: 15/348,979

(22) Filed: Nov. 10, 2016

(65) Prior Publication Data

US 2017/0220052 A1 Aug. 3, 2017

Related U.S. Application Data

(60) Provisional application No. 62/254,326, filed on Nov. 12, 2015.

(51) Int. Cl.
*G05D 16/04* (2006.01)
*B63C 11/22* (2006.01)

(52) U.S. Cl.
CPC .......... *G05D 16/04* (2013.01); *B63C 11/2209* (2013.01)

(58) Field of Classification Search
None
See application file for complete search history.

(56) References Cited

U.S. PATENT DOCUMENTS

| | | | | |
|---|---|---|---|---|
| 4,714,077 A * | 12/1987 | Lambert | ................ | A62B 9/00 128/202.27 |
| 4,974,584 A * | 12/1990 | Goodnoe | ................ | A62B 9/00 128/202.13 |
| 5,379,761 A * | 1/1995 | Schuler | ................... | A62B 9/02 128/204.26 |
| 5,738,088 A * | 4/1998 | Townsend | ............... | B63C 11/18 128/202.27 |
| 6,170,483 B1 * | 1/2001 | Ronjat | ................. | B63C 11/205 128/201.11 |
| 7,866,338 B2 * | 1/2011 | Mele | ....................... | A62B 9/02 128/202.27 |
| 8,256,420 B2 * | 9/2012 | Prete | .................... | A62B 18/006 128/204.18 |

* cited by examiner

*Primary Examiner* — Daphne M Barry

(57) ABSTRACT

An attachable, detachable pressure reducing regulator for use with a primary high-pressure gas source, wherein the high-pressure chamber of said regulator includes a secondary gas IN portal, with a one-way valve, through which the primary container source may be refilled from an external gas source, via the high-pressure chamber of the said regulator, either independently of or concurrently during its use as a pressure reducing regulator.

10 Claims, 2 Drawing Sheets

BI-DIRECTIONAL REGULATOR SYSTEM FOR SIMULTANEOUS HIGH-PRESSURE FILLING AND LOW-PRESSURE DEPLETING OF GAS TANK

CROSS-REFERENCE RELATED APPLICATIONS

This Application claims the benefit of provisional patent applications:
No. 62/254,326, Dated Nov. 12, 2015

FEDERALLY SPONSORED RESEARCH

None

SEQUENCE LISTING

None

BACKGROUND

Field of Invention

This invention relates to a pressure reducing regulator that allows the replenishment of a High-Pressure tank based gas source from an external gas supply, while the regulator simultaneously reduces said tank based gas source to an intermediate or low level output, that may change dynamically relative to the ambient pressure in which the regulator is operating.

BACKGROUND

Prior Art

This invention relates to the combined, redundant and replenish-able delivery of gas sources to Users operating in adverse environments. By example, Users of this invention may be underwater divers (SCUBA), or First Responders (SCBA) operating in surface confined spaces such as wells, tunnels, mines, collapsed structures. Users in said adverse environments require a supply of breathing gas. Commonly the gas is supplied by a High-Pressure tank mounted on the User's back, side or front. The tank based supply of gas is limited to the available gas within the tank. If the supply is insufficient for the length of time required by the User, it must be replenished.

Most commonly, the tank is simply replaced with a fresh tank. This however, poses problems. The User must terminate his operation, return to surface safety to replace the tank. If the User is working under pressure (i.e. underwater), returning to the surface is time consuming. Delivering a replacement tank (particularly in the event of an emergency) may be difficult to accomplish, particularly if there are obstructions that prevent said delivery, within the time constrains of the gas tank supply being replaced.

In very difficult to operate in environments, a more beneficial system for supplying breathing gas is through a gas umbilical line. In this scenario, the high-pressure tank is usually provided, but as a means of backup air, in the event a failure by the umbilical supply.

The method of allowing Users to breath from a High-Pressure gas source, such as a tank, which may hold 6,000 psi or more, is by a regulator system of pressure reducing stages. Said a multiple stage system allows the reduction of a constantly varying High-Pressure gas source, to be adjusted downward to a constantly varying Low-Pressure. as needed by the User. The variability of the High-Pressure is a function of the amount of air within the tank. The variability of the Low-Pressure needed by the User, is a function of the ambient pressure in which the User is located. If the User is at the surface, such as firemen or search and recovery ("SAR") specialists working in confined spaces (wells, tunnels, collapsed structures) the ambient pressure is at one atmosphere (about 15 psi). However, if the User is underwater, the ambient pressure increases substantially with depth. The rate of pressure increase is 1 atmosphere (about 15 psi) for every 33 feet of additional depth. For example, at 330' of depth, the ambient pressure upon the User is approximately ten times the pressure it would be if the User was located at the surface. Because of the variability of both the tank pressure and the ambient pressure, the method of reducing the High-Pressure within the source tank, to the depth related pressure of the User, requires a dynamic adjustment.

The method of dynamically adjusting the pressure that is delivered to the User from a tank is by a pressure reducing regulator. This commonly employs a "First Stage" (or intermediary stage) regulator which reduces the gas from the High-Pressure of a supply tank to a nominal level that is approximately (150 psi) above the ambient pressure of the environment (depth) at which the User is located. A Second Stage is then incorporated to further reduce the gas pressure to a suitable level for the User to breath naturally at the ambient pressure the User is located.

The First Stage and the Second Stage regulators are separate and commonly connected via a "low/intermediate" pressure hose.

The focus of this invention is on the First Stage, which reduces the High-Pressure of the supply tank, to an intermediate pressure level, that commonly is approximately 125-150 psi, over the ambient pressure. The actual pressure difference is irrelevant to the purpose and operation of the instant invention.

To function properly, the First Stage regulator must respond dynamically to both the changing ambient pressure and the changing (lowering) pressure within the tank as the air is consumed. This need has been the focus of many decades of design development.

Multiple methods of adjusting the intermediate Gas OUT pressure to a suitable gas pressure over the ambient pressure have evolved. However, regardless of the design version, they all incorporate one feature in common: a "High-Pressure Gas IN chamber."

The "High-Pressure Gas IN chamber" is connected directly to the High-Pressure tank source. This is accomplished by a yoke or screw-on fitting, that mates with the on/off valve located on the High-Pressure supply tank.

The High-Pressure Gas IN chamber has one (1) Gas IN Port. That port opens to the fitting connecting it to the source tank. The Gas IN Port has minimal restrictions to the flow of air coming into the High-Pressure chamber. The design goal is always to maximize the flow of air into the Gas IN chamber.

The High-Pressure Gas IN chamber may have one or two Gas OUT Ports. Said Gas OUT Ports highly restrict the flow of High-Pressure gas out of the chamber. This is accomplished by reducing the inside diameter of the gas OUT Port to no larger than a pin head. It is very small. The purpose is to severely restrict the flow of gas out of the High-Pressure gas IN chamber. Prior to the instant invention, the only purpose for any Gas port to exist on the High-Pressure chamber—that directly accessed the outside of said chamber was to connect a High-Pressure gauge. The gauge does not need air flow, for it to function. It only needs enough air arriving at its sensor to determine the pressure of the air, within the High-Pressure chamber. That pressure in turn mirrors the pressure within the tank source, to which it is connected.

The second reason why this orifice is highly restrictive is that in the event of leakage or gauge failure, the tank will not deplete its air explosively. It instead will deplete very slowly, and allow the User time to remedy the emergency situation.

Following the flow from a standard High Pressure Gas Chamber, the gas then enters a chamber where variety of mechanical designs are employed to reduce the tank's High-Pressure to a pressure that is a predetermined pressure above the ambient pressure. Commonly, and for example purposes only within this application, that pressure will be stated as 150 psi over the ambient pressure. For purposes of this application, this pressure will be termed "Low-Pressure."

Currently, there are several different primary designs to accomplish this. Other designs may evolve in the future. Whatever design is used, is irrelevant to the claims within this application, as they all occur after the application of the design claims of the instant invention. The following information is used for historical, information purposes only.

The Unbalanced Piston is the simplest design. However, its performance at delivering air to the User, varies with the tank pressure and increased ambient pressure. An alternative design: called a "Balanced Piston Regulator," reduces the breathing difficulty caused by reduced tank pressure. Another design: the Unbalanced Diaphragm Regulator is also problematic. If it fails, it will terminate the air to the User. This design flaw was remedied by the Balanced Diaphragm Regulator. In the event of failure, it will continue to deliver air to the User. Within these basic designs, are nuances that improve performance.

The goal of each of these designs, is to efficiently reduce the tank pressure, following the regulator's High-Pressure Gas Chamber, to a predetermined Low-Pressure level above the ambient pressure. This pressure is realized at the Low-Pressure Gas OUT chamber. This chamber usually as multiple Gas OUT Ports, to which various external devices may be connected. Termed "Low-Pressure" ports, they each supply pressure/depth adjusted gas, through a "Low-Pressure ("LP") hose. If the LP hose is to deliver breathing gas to the User, it is then connected to a Second Stage regulator. Said Second Stage regulator reduces the gas pressure to exactly that needed by the User, as determined by his/her depth. Additional Gas OUT Ports may deliver identical pressure adjusted gas to other User devices, such buoyancy control devices, exposure suits, or gas inflation valves.

The instant invention has no relationship to the design method for reducing the "High-Pressure (HP)" gas following its exit from High Pressure Gas Chamber, to that within the LP chamber. Nor does it have any relationship to the Gas OUT Ports within the Gas OUT chamber.

The instant invention relates only to the design innovation of incorporating a Secondary Gas IN Port with a one-way "check" valve on the High-Pressure Gas Chamber. This now allows delivery of HP gas from a secondary HP source, that is external to and separate from the primary tank-based gas source to not only pass into the High-Pressure Gas Chamber, but to also refill the tank source connected to the Primary Gas IN Port. Furthermore, the claims of the instant invention are limited to Gas Regulators that maybe interchangeably attached to the on/off valves that are attached to their host gas source, principally HP tanks and cylinders.

Surface Supplied Breathing Gas

As disclosed hereinabove, the problem for a User of a tank based supply of air is the limited supply of air available within the tank. This is particularly so if they are working at great depth underwater. Air consumption increases greatly with depth. When the tank supply is exhausted, it must be replaced. This requires the User to return to the safety of the surface remote operator, to change the tank. This process also requires the removal of the First Stage regulator from the on/off valve of the tank. Current First Stage regulators, that are attach to tank on/off valves, have no allowable method for the refilling to the tank, while the regulator is still attached to the on/off valve. Similarly, current First Stage regulators of this type also do not allow for the real-time replenishment of the tank's gas supply, during its use as a pressure reducing regulator, The alternative to a tank based gas supply is a surface supplied air system. In this system, an unlimited supply of air is delivered through an umbilical gas line from the remote operator to the User. Used in a Surface Supplied Air ("SSA") configuration, the tank based air supply is used as a backup system, in the event of interruption of the surface air supply.

Access to the backup supply of air is accomplished by one of two methods. First, the backup supply is completely independent, with a separate regulator system. The User must then remove the regulator from his mouth, and replace it with a different regulator coming from is back up tank. This poses serious safety issues, including the gestation of highly contaminated waters or toxins, when the second device is inserted into the User's mouth. The second method of switching gas sources, is through the use of a gas switch block to which both the surface and the tank based supplies are connected.

When configured with a Gas Block, ("GB") the primary Low-Pressure tank Gas OUT port is connected via a LP hose to one LP Gas IN Port on the GB. The SSA must be delivered at a Low-Pressure, equal to the Low-Pressure gas arriving from the First Stage regulator attached to the tank. The user may select the appropriate gas source, by switching between the two Low-Pressure Gas IN Ports on the GB. The GB also has a Low-Pressure Gas OUT Port, which connects to the Second Stage regulator, via a LP hose. Identically is without the use of a GB, the Second Stage regulator adjusts the gas pressure to equal the ambient pressure, to allow natural breathing by the User.

The SSA configuration offers the User the benefit of an unlimited supply of air, that is monitored and delivered by a remote operator, from a safe location. That location may be several hundred feet or more away from the User. In this configuration, the User's High-Pressure tank supply is a backup source, to the primary source coming from the remote SSA.

The Gas Block method is a safe method for delivering two gas sources to the User. However, it requires multiple hoses, and a mechanical switch block all which introduce additional "points of failure." A point of failure is a connection point that requires a method of sealing, and therefore can be disconnected or fail. All methods of sealing eventually fail.

Although this system has its benefits, they are most beneficial where the User and the Supplier are both on the surface—at the same ambient pressure. Where this arrangement becomes problematic, is when the User is at a far great ambient pressure than surface supplier—i.e. underwater. The reason is the pressure requirement of the Second Stage regulator. It must receive incoming air pressure at approximately 150 psi over the ambient pressure. This requires the surface operator to always be aware of the exact depth of the User. This in turn requires additional monitoring equipment and devices, to be connected between the User and surface supplier, in order for the supply pressure to be properly adjusted for the depth of the User. The informational and technical equipment required by this, creates additional "points of failure," both in terms of information and gas flow.

A third option, is to have an SSA delivered by a High-Pressure umbilical hose, where the gas source is equal or greater to the pressure within the User's HP tank source, and furthermore is connected directly via a one-way valve to a secondary High-Pressure Gas IN Portal on the first stage regulator, without need of a Gas Block.

The purpose of the invention is to eliminate all possible sources of User error, reduced safety and "points of failure." This includes 1) eliminating those created by the Gas Block, 2) the requisite additional hoses that must be connected, for its use and 3) user error in selecting the incorrect gas source, or if a GB is not used, by ingesting toxins by inserting an independent regulator into the User's mouth that has been previously exposed to a dangerous environment.

This option is accomplished by the use of an SSA gas line that is able to simultaneously and directly replenish the diminishing gas supply within the tank (as it exits the LP Gas OUT Ports on the First Stage regulator).

To accomplish this feat, requires a connection port never before contemplated in the design of First Stage regulators: a second High-Pressure Gas IN Port, that allows the tank onto which the regulator is mounted, to be filled in real time, through an externally connected, High-Pressure umbilical gas line source, to which the First Stage regulator is connected.

The connection point is made directly between the User's end of the SSA and the Secondary High-Pressure Chamber of the First Stage regulator. Importantly, said Secondary High-Pressure Gas IN Port must; a) only allow the flow of gas to be inward into the High-Pressure Chamber. It cannot be allowed to flow in reverse. Furthermore, said Secondary High-Pressure Gas port must: b) allow unrestricted flow of gas into the High-Pressure Chamber, as freely as the Primary High-Pressure tank source. Said Secondary High-Pressure Gas IN Port cannot have any restrictions to air flow, as normally exists on the High-Pressure Gas Chamber OUT Ports, as described hereinabove. Furthermore, the High-Pressure Gas Chamber must simultaneously allow unrestricted gas to flow from the Secondary High-Pressure Gas IN Port, through the High-Pressure Chamber into the Primary Source Tank (for replenishment), as well as from the Primary Source Tank into the remaining chambers of the regulator. For it is within the chambers that follow the High-Pressure Chamber, that ambient sensitive adjustment are made downward to the Low-Pressure Gas OUT Port, which in turn allows delivery to the User via the Second Stage Regulator or other connective devices.

Furthermore, to prevent the backward flow of gas through the Secondary High Pressure Gas IN Port, said port must have a one way valve ("check valve"). Said check valve will allow the flow of gas in only one direction: into the High-Pressure Chamber of the First Stage regulator—and not out.

By inter-connecting, (via the High Pressure Gas IN Port on the First Stage regulator), the High Pressure SSA with the tank, all the following benefits are achieved:

1. The simplicity of a single hose connection from the First Stage regulator to the Second Stage regulator is maintained. No additional hoses, or gas switching blocks are required. The User has no need to manually switch regulators or to switch/connect/disconnect source gas lines with a GB. The continual, real-time replenishment of his tank based gas supply is achieved automatically.

2. The remote operator of the surface gas supply has no need to know, or employ additional equipment to monitor or adjust the pressure going to the User, in response to the ambient adjusted pressure requirements of the Second Stage regulator. The Second Stage operates identically as if no umbilical supply were connected. The gas pressure to which it responds comes directly from the tank supplying the First Stage regulator.

3. The air pressure in the User's tank is automatically controlled from the surface. The surface supplied gas pressure going to the User's tank, will always be the minimum level of pressure within the User's tank. If the SSA is supplying 3,000 psi, that will be the minimum pressure within the User's tank. If the SSA is supplying 1,500 psi, that will be the minimum pressure within the User's tank.

4. Because the User's gas supply is derived through the First Stage regulator, all other commonly available functions remain, and are replenished in identical fashion. This includes the use of an "octo", or alternative Second Stage regulator to be use for "buddy breathing" by underwater Users. It includes the supply of gas for the underwater User's Buoyancy Control Device, Dry Exposure Suit or other tools, accessories.

5. For surface (i.e. Confined Space) User's, the High-Pressure supply allows for the connection of additional gas masks/gas supply to victims being rescued, from the same system as the User/First Responder.

6. For all Users, the use of a High-Pressure gas supply greatly reduces the OD dimensions of the hose that supplies the User. The OD/ID can be much smaller, lighter, more flexible, because the High-Pressure allows a greater volume of air to flow through a substantially smaller diameter hose.

7. For all Users, both underwater and on the surface, if the User entered the adverse environment, without use of an SSA (i.e. relying on the User's High Pressure tank as the Primary Gas supply) the User may still add the SSA, via a quick connect with check valve, even after entering the adverse environment.

8. For all Users, both underwater and on surface, the invention allows for the refilling of the tank, without removal of the regulator. Normally any First Stage regulator that is attached to a tank, must be removed, to allow the connection of a High-Pressure compressor or bank of gas cylinders to fill these types of tanks. The instant invention allows the tank to be replenished in its entirety either at the surface, or within the adverse environment (i.e. underwater or in confined space), without removing the First Stage regulator from the tank.

PRIOR ART

U.S. Pat. No. 7,686,032 B2
First Stage scuba diving regulator having an intermediate pressure spring protected from ice-induced blockage
U.S. Pat. No. 5,368,022 A
In-line First Stage air pressure regulator for use in scuba diving
An in-line air pressure regulator for scuba diving is designed to augment an independent air supply system in the event of a failure of the primary pressure regulator.

U.S. RE36223 E
First Stage scuba regulator
A First Stage pressure regulator for use with a High-Pressure source of breathable gas includes a housing and either a yoke arrangement for connection to the conventional U.S. High-Pressure gas source or a DIN connection for coupling to a European-type gas source.
U.S. Pat. No. 3,799,189 A
First Stage scuba regulator
A yoke for attaching a tank valve to an inlet fitting of the regulator has a threaded base ring telescoped over the inlet fitting, the base ring engaging a lead screw journalled on the base of the fitting. Rotation of the lead screw moves the yoke to clamp or release the tank valve.
U.S. Pat. No. 4,230,140 A Environmental First Stage scuba regulator
A First Stage scuba regulator operates to supply breathable air at a pressure of say, about 125 psi above ambient to a Second Stage demand regulator.
U.S. Pat. No. 5,509,407 A First Stage pressure regulator with flow around seat
A First Stage pressure regulator for use with a High-Pressure source of breathable gas includes a housing and means for attaching the housing to a High-Pressure source of breathable gas.
U.S. Pat. No. 5,775,368 A First reducing stage for a two-stage regulator
First reducing stage for a two-stage regulator, including a nozzle connected by a yoke and a clamping screw to an inlet, a pressure chamber, and a shutoff member that slides, guided by a piston or by a diaphragm, inside the pressure chamber.
U.S. Pat. No. 5,097,860 A Pressure regulator for underwater breathing apparatus
The First Stage regulator of a two-stage underwater breathing apparatus utilizes an imperforate force transfer mechanism to automatically increase the rate at which breathing air is delivered from a High-Pressure supply to the Second Stage regulator as the diver descends in the water.

CONCLUSION

To the best knowledge of the Inventor, no prior art exists wherein the High-Pressure chamber of a source tank mountable the First Stage regulator, contains a second unrestricted High-Pressure gas IN Port, with one-way valve, for the direct connection of an alternative, High-Pressure gas source, in order to provide a simultaneous, real-time method of replenishing the High-Pressure tank onto which the removeable First Stage regulator is connected, while simultaneously operating as a standard First Stage regulator, attached to the on/off valve of a High-Pressure tank-based gas source.

SUMMARY

The invention is an innovative new method of delivering breathing gas to a User working in an adverse environment. It: 1) reduces the size and complexity of the equipment required, 2) reduces the possible points of failure, and opportunity for User error, 3) automates the process of determining the pressure required by a Second Stage regulator to delivery ambient pressure adjusted breathing gas to the User, 4) allows for a post adverse-environment entry connection of a Secondary Gas supply, 5) provides for the seamless refilling of a tank based gas source by a remote based gas source, concurrently with the standard operating procedure of reducing a High-Pressure Gas IN source to a Low-Pressure Gas OUT Portal, that is properly adjusted to the ambient pressure of the User.

BRIEF DESCRIPTION OF THE DRAWING

System Diagram

The drawing is a schematic of the system, for supplying breathing gas from a High-Pressure secondary external source, into a High-Pressure Primary Gas source, through the High-Pressure Chamber of a First Stage regulator. All pressure reducing regulators have a High-Pressure Chamber. Said chamber is attached to the on/off valve, which controls existent or non-existent flow of air from the High-Pressure gas source (normally a cylinder). The specifications for this system, are independent of the regulator design that controls the air flow after it exits the High-Pressure chamber. The instant invention pertains only to the High-Pressure chamber of any pressure reducing regulator. The following description details each of the nine (9) features and functions shown in the Drawing 1 (with annotations) and Drawing 2 (without annotations.) Is any High-Pressure gas source, but most commonly is a cylinder or tank, containing High-Pressure gas.

Figure 1:
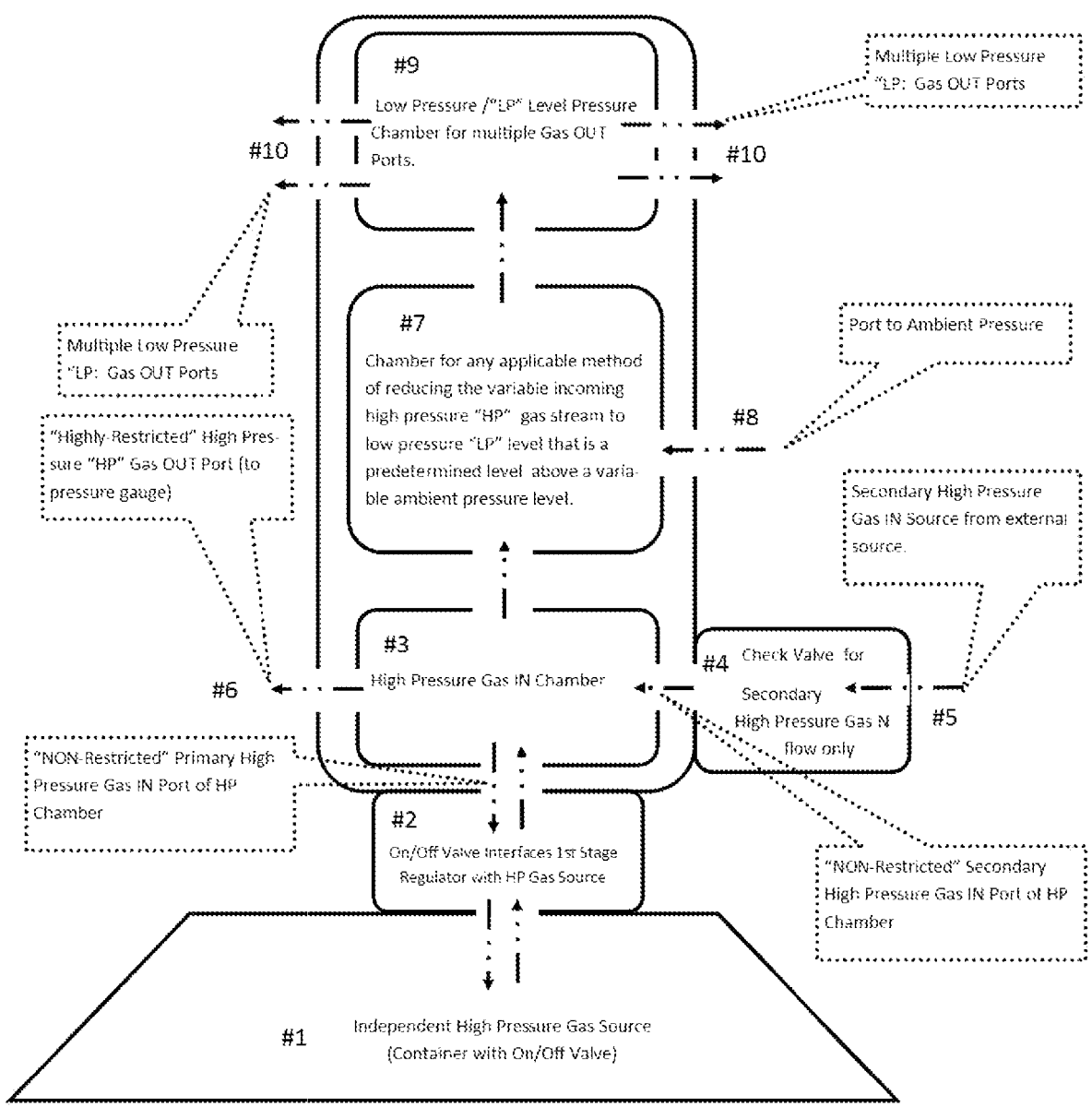
Figure 2:
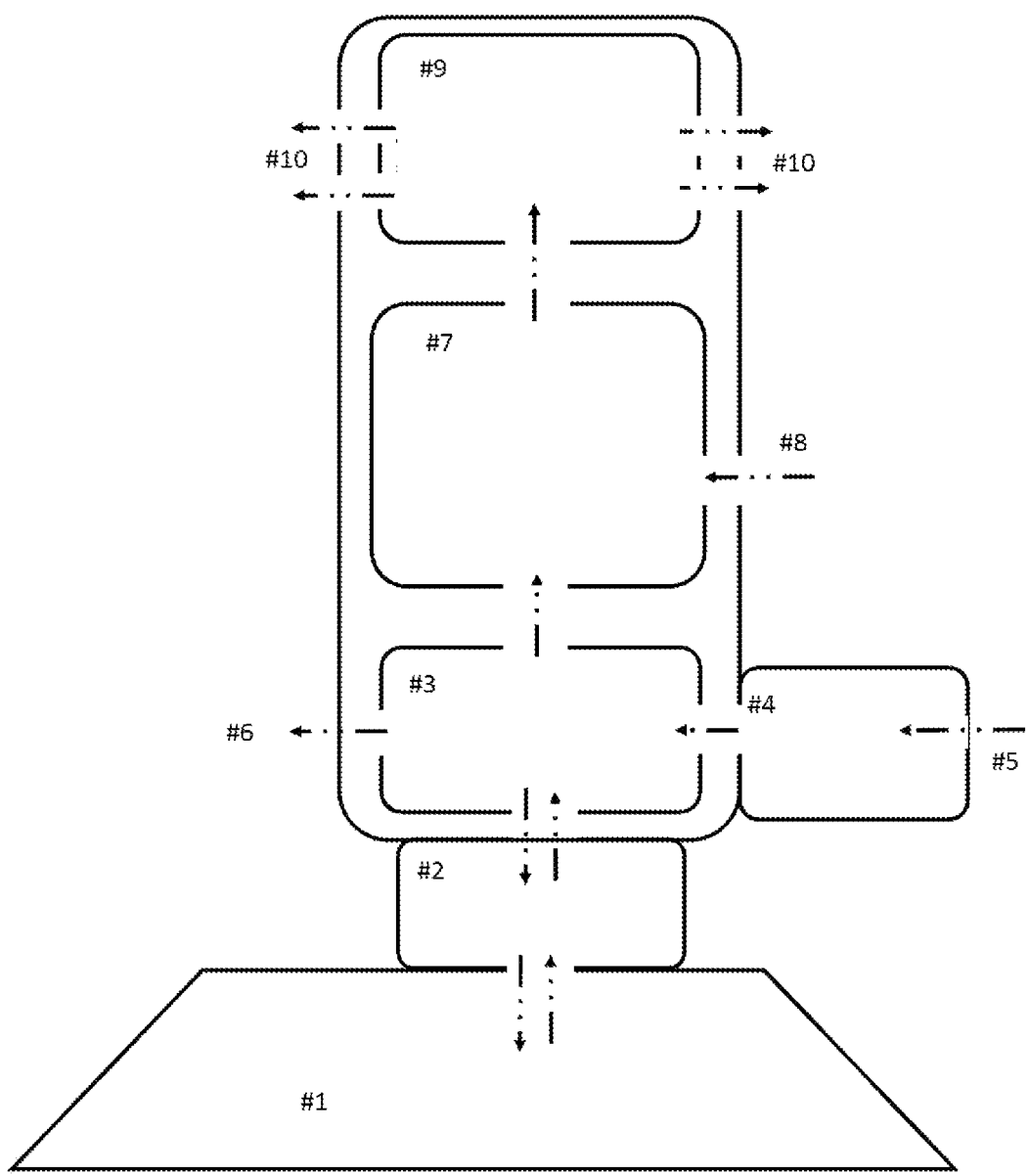

1. Is a High-Pressure On/Off valve, used to determine the existent/nonexistent flow of gas into and out of the High-Pressure cylinder. The gas passes from the cylinder, through the Primary Gas IN Port, into the High-Pressure Chamber. In the instant invention, it also allows the reverse; for the cylinder to receive incoming gas from the High-Pressure Chamber.
2. High-Pressure Chamber. This chamber is connected, via the On/Off Valve (#2), to the Primary Gas source gas cylinder (#1), through the "NON-Restricted" Primary Gas IN Port of the High-Pressure Chamber.
3. Check Valve allows the flow of gas, through a new, Secondary Gas IN Port (#5). The one-way valve allows the flow of gas from any secondary source to enter (but not exit) the High-Pressure Chamber (#3). Exclusive of the direction of flow, this is an NON-Restricted port. It allows an equally unrestricted (as the Primary Gas IN Port) gas to flow into (but not out of) the High-Pressure Chamber.
4. Secondary High Pressure Gas IN Port, for delivery of gas from any external High Pressure source.
5. High-Pressure Gas OUT Port. This port is a highly flow-restricted Gas OUT Port. It commonly is used to connect pressure sensing devices, that do not require gas flow, to operate the sensor.
6. Pressure Adjusting Chamber. Designed in a variety of different ways, this chamber reduces the gas exiting the High-Pressure Gas Chamber, into the Intermediate/Low-Pressure Chamber. The common purpose of this chamber is to adjust the variable source pressure (arriving from the High-Pressure Chamber) to a suitable Gas OUT Port pressure, that is adjusted, relative to the ambient operating pressure of the device. For Second Stage regulators, this commonly is 125-150 psi, above the ambient pressure. This chamber has a port (#8), that allows the chamber to sense the ambient pressure in which it is operating.
7. Ambient Pressure Port, allows the Pressure Adjusting Chamber to know the ambient pressure in which the regulator is operating.
8. Low-Pressure Chamber. This chamber commonly has multiple Low-Pressure Ports, to which multiple "Low-Pressure Devices" may be connected and enervated.

Said devices may be for connection to Second Stage Regulators, for breathing, or Buoyance Control Devices or Exposure Suit Control, or gas pressure operated tools, such as safety alarms.
9. Low-Pressure Gas OUT Ports. Multiple ports for connecting Low-Pressure devices.

I claim:

1. A high-pressure reducing gas regulator for use both above and below sea-level, a housing comprising:
   a first high-pressure gas inlet-outlet portal including a first fitting connectable to an on-off valve, said on-off valve connectable to a primary high-pressure gas source, said first high-pressure gas inlet-outlet portal being configured to receive a high-pressure inlet gas from said primary high-pressure gas source and to provide a secondary high-pressure gas from a secondary high pressure gas source to said primary high-pressure gas source:
   a second high-pressure gas inlet portal including a second fitting with a one-way valve connectable to said secondary high-pressure gas source, said second high-pressure gas inlet portal being configured to provide said high pressure gas from said second high-pressure gas source to said first high-pressure gas inlet-outlet portal;
   a pressure adjusting chamber configured to receive said high pressure inlet gas of said primary high-pressure gas source from said first high-pressure gas inlet-outlet portal, said pressure adjusting chamber being configured to dynamically reduce said high-pressure inlet gas to low-pressure outlet gas:
   at least one dynamically adjustable ambient pressure portal configured to provide ambient pressure to said pressure adjusting chamber; and
   at least one dynamically adjustable low-pressure gas outlet portal configured to receive said low-pressure outlet gas from said pressure adjusting chamber;
   wherein said pressure adjusting chamber is configured to dynamically adjust said low-pressure outlet gas to a predetermined outlet pressure in response to a variable ambient pressure receive by said ambient pressure portal;
   wherein said first high-pressure gas inlet-outlet portal is configured to provide a direct flow path of said secondary high-pressure gas from said second high-pressure gas inlet portal to said primary high-pressure gas source.

2. The high-pressure reducing regulator of claim 1, wherein said outlet pressure is suitable for any one of breathing and powering tools and devices.

3. The high-pressure reducing regulator of claim 1, further comprising a method of dynamically reducing a pressure of said high-pressure inlet gas to said outlet pressure in response to a change in external ambient pressure level.

4. The high-pressure reducing regulator of claim 1, further comprising one or more gas out portals for measuring a pressure level within said first high-pressure gas inlet-outlet portal.

5. The high-pressure reducing regulator of claim 1, wherein said low-pressure gas outlet portal further comprising one or more gas out portals for distributing said low-pressure outlet gas for breathing, and powering tools and devices.

6. The high-pressure reducing regulator of claim 1, wherein said first high-pressure gas inlet-outlet portal is configured to directly communicate said second high-pressure gas from said second high-pressure gas inlet portal to said primary high-pressure gas source.

7. The high-pressure reducing regulator of claim 1, further comprising a housing for including said first high-pressure gas inlet-outlet portal, said pressure adjusting chamber, and said low-pressure gas outlet portal.

8. The high-pressure reducing regulator of claim 7, wherein said ambient pressure portal is defined through said housing and in communication with said pressure adjusting chamber.

9. The high-pressure reducing regulator of claim 7, wherein said second high-pressure gas inlet portal is defined through exterior of said housing.

10. A method of using a housing with a high-pressure reducing gas regulator to reduce a high-pressure gas source through a series of pressure reducing chambers to low pressure for distribution through one or more low-pressure gas outlet ports, said method comprising the steps of:
   a) receiving in a first high-pressure gas inlet-outlet portal a high-pressure inlet gas at a first pressure from a primary high-pressure gas source;
   b) receiving in said first high-pressure gas inlet-outlet portal a secondary high-pressure gas from a second high-pressure gas inlet portal including a second fitting with a one-way valve connectable to a secondary high-pressure gas, source;
   c) receiving in a series of pressure reducing chambers said high-pressure inlet gas from said first high-pressure gas inlet-outlet portal, and dynamically reducing said high-pressure inlet gas to low-pressure outlet gas at a second pressure lower than said first pressure;
   d) communicating said secondary high-pressure gas through said first high-pressure gas inlet-outlet portal and dynamically reducing said high-pressure inlet gas to low-pressure outlet gas at a second pressure lower than, said secondary pressure;
   e) dynamically adjusting said low-pressure outlet gas to said second pressure in response to a variable ambient pressure receive in said pressure reducing chambers by a ambient pressure portal; and
   f) providing said low-pressure outlet gas to a dynamically adjustable low-pressure gas outlet portal.

\* \* \* \* \*